(12) United States Patent
Navarro (10) Patent No.: US 6,484,745 B1
(45) Date of Patent: Nov. 26, 2002

(54) FILL VALVE ASSEMBLY

(76) Inventor: Ramon Munoz Navarro, 4829 E. Walnut Ave., Orange, CA (US) 92867

( * ) Notice: Subject to any disclaimer, the term of this patent is extended or adjusted under 35 U.S.C. 154(b) by 39 days.

(21) Appl. No.: 09/642,889

(22) Filed: Aug. 22, 2000

Related U.S. Application Data (60) Provisional application No. 60/165,788, filed on Nov. 16, 1999.

(51) Int. Cl.⁷ .............................. G01M 3/08; B08B 3/02; B08B 9/032; F16K 23/00
(52) U.S. Cl. ...................... 137/312; 251/63.5; 137/240; 137/15.05; 137/15.06; 137/15.11; 92/13.8; 239/119
(58) Field of Search ................................ 137/240, 312, 137/15.05, 15.06, 15.11; 251/63.5, 63.6; 92/13.8; 239/119

(56) References Cited

U.S. PATENT DOCUMENTS

| | | | | |
|---|---|---|---|---|
| 1,645,071 A | * | 10/1927 | Potter | 239/119 |
| 2,010,129 A | * | 8/1935 | Baker | 92/13.8 |
| 3,118,611 A | * | 1/1964 | Berlyn | 239/119 |
| 3,290,003 A | * | 12/1966 | Kessler | 251/63.6 |
| 3,512,550 A | * | 5/1970 | Ammann | 92/13.8 |
| 3,517,688 A | * | 6/1970 | Scholle | 137/240 |
| 3,838,707 A | * | 10/1974 | Wachowitz, Jr. | 137/312 |
| 3,999,932 A | | 12/1976 | Matthews | 431/54 |
| 4,365,754 A | * | 12/1982 | Levine et al. | 251/63.5 |
| 4,518,021 A | | 5/1985 | Copas et al. | 141/172 |
| 4,648,874 A | | 3/1987 | Kurtz et al. | 137/205 |
| 4,888,979 A | | 12/1989 | Steeper | 73/46 |
| 5,102,094 A | * | 4/1992 | Washam et al. | 92/13.8 |
| 5,152,320 A | * | 10/1992 | Zimmerly | 137/312 |
| 5,263,682 A | * | 11/1993 | Covert et al. | 137/312 |
| 5,810,045 A | * | 9/1998 | Evans | 137/312 |
| 5,954,086 A | * | 9/1999 | Ronchi | 251/63.5 |

* cited by examiner

Primary Examiner—George L. Walton
(74) Attorney, Agent, or Firm—William D. Breneman; Peter J. Georges; Breneman & Georges (57) ABSTRACT

A positive control fill valve for dispensing fillable materials which eliminates dripping, splashing, sloshing and contamination of fill materials is provided with a fluid activiated fill piston having a substantially cylindrical piston sealing head cooperating with a tapered seat for receiving the piston filling head in combination with a leak detection port for positively detecting potential leaks between the fluid activated fill piston and the product fill chamber. The novel fill valve preferably includes at one end, a pneumatic means for opening and closing the fill valve piston and at the other end, a fill chamber having a tapered seat for positively seating the sealing head of the pneumatically activated piston with a product inlet means disposed therebetween and a two seal arrangement separating the pneumatic chamber at one end from the product dispensing chamber at the other end and a leak detection port disposed intermediate the two seals. The novel fill valve assembly provides rapid and positive control in dispensing fill materials of various viscosities and densities, while at the same time, preventing a contamination of fill materials with fluid activation fluid by employing a leak detection port for immediately detecting and identifying the position of a potentially defective seal.

44 Claims, 7 Drawing Sheets

FILL VALVE ASSEMBLY

This application claims the benefit of No. 60/165,788, filed Nov. 16, 1999.

BACKGROUND OF THE INVENTION

1. Field of the Invention

The invention pertains to a novel positive control fill valve, particularly suited for application in the dispensing of flowable materials in hygienic or sanitary dispensing operations, such as used in the food, medical and pharmaceutical industries. More particularly, the novel fill valve assembly provides for the positive control over the dispensing of a wide range of liquids having varying degrees of viscosity by utilizing a positive control valve activated by a pneumatically activated piston, having a substantially cylindrical shaped sealing head in combination with a tapered cylinder for providing a positive control over the dispensation of fluids dispensed through the fill assembly.

The novel fill assembly includes at one end, a reservoir for activating the positive controlled product dispensing piston and at the other end, an outlet having a tapered sealing seat for dispensing the product and seating the sealing head of the product dispensing piston. A leak detection port for positively identifying seal failure is disposed between a positive seal means having a first seal disposed between the leak detection port and the reservoir for activating the product dispensing piston and a second seal disposed intermediate the leak detection port and the product dispensing outlet. The novel hygienic and sanitary fill valve assembly further includes flanges for connecting the reservoir which in the best mode is a chamber for activating the product dispensation piston with a corresponding flange around the bottom of the dispensation chamber to allow the novel fill valve assembly to be cleaned or sterilized in place, as is preferred in the pharmaceutical, medical and food processing industries.

The flanges for connecting the product dispensing outlet from the pneumatic activation chamber, as well as for the cleaning in place mechanism, provide a hygienic and sanitary environment, which allows for effective cleaning of the valve, piston and internal components of the novel fill valve assembly to prevent the build up of contaminants in threads, seams, welds, or other surface irregularities in the novel fill valve assembly. The novel fill valve assembly is typically constructed of high quality stainless steel or other material that is compatible with food processing equipment.

2. Description of Related Prior Art

The prior art includes many types of product dispensation valves for dispensing product. Many of these prior art valves do not include a tapered sealing seat in combination with a pneumatically activated piston for providing a positive shut-off of viscous fill materials. Many of the prior art valves result in a dripping or sloshing of a fill material around the filled container. None of the prior art includes a tapered seat in combination with a substantially cylindrical sealing head for positively shutting off the flow of dispensed material by seating the substantially cylindrical head of a product dispensing piston in a tapered seat when the valve is in the closed position and the placement of the sealing head is in the flow path of the dispensed product to circulate the fill material around the sealing head to prevent sloshing of the fill material during dispensation. Further, none of the known prior art dispensing valves includes a novel leak detection port disposed intermediate the ends of the product dispensing piston in combination with a novel positive seal means which includes, at one end, a seal between the piston activation chamber and the leak detection port and a second seal disposed between the product dispensation chamber and the leak detection port so that failure of the seal at either side of the leak detection port results in a positive identification of the exact portion of the seal that is damaged.

The best known prior art fill assembly valves typically employed in the food processing industry are not known to have a leak detection port in combination with a piston with a tapered seat and nozzle combination for positively dispensing liquid products without sloshing or dripping.

The best known fill valve assemblies uncovered in the course of the prior art search is Copas, et al. U.S. Pat. No. 4,518,021 which discloses a similar type of flanged fill machine having a product dispensing nozzle with a side inlet. The nozzle includes a tapered nozzle end and product, dispensing piston in the up position does not remain in the flow to prevent sloshing and does not employ a sealing head forming a dual function. Further Copas, et al. does not contain a leak detection port or a pneumatic means to positively control the dispensation of the product or provide a system for assuring that the fluid activation of the product dispensing piston would not contaminate the fill product material to assure the highest quality of product dispensing and handling.

The prior art includes also a variety of leak detection ports for a variety of applications. Leak detection ports have been provided for gas flow applications such as Matthews U.S. Pat. No. 3,999,932, Kurtz, et al U.S. Pat. No. 4,648,874 and Steeper U.S. Pat. No. 4,888,979. None of these prior art patents teach or suggest the utilization of a leak detection port in a filling machine such as Copas, et al. U.S. Pat. No. 4,518,021. Further, none of the known prior art leak detection port devices utilizes a double seal arrangement around a piston to identify the failure of a seal to prevent the contamination of a fill product. The closest of the known leak detection port apparatus is Steeper U.S. Pat. No. 4,888,979, which pertains to leak detection across an O-ring sealing a flanged connection. This leak detection provided in Steeper U.S. Pat. No. 4,888,979 pertains to leak detection radially along the O-ring as opposed to axially as is provided in accordance with the novel fill valve assembly of the invention.

SUMMARY OF THE INVENTION

A novel sanitary fill valve assembly providing positive control over dispensed liquids and preventing contamination between the dispensed liquids and the means for activation of the piston is provided by a novel leak detection port for providing the positive identification of seal failure before contamination of a dispensed product. The novel hygienic fill valve assembly includes, at one end, a fluid chamber for providing the positive control over a piston for providing for the dispensation of a fill material through a product outlet chamber to a fill material outlet or nozzle disposed at the other end for dispensing the fill product and a product inlet port disposed intermediate the fluid chamber and the product dispensation outlet or nozzle. A positively controlled fluid activated piston is disposed intermediate the fluid chamber and the product outlet chamber, which includes a substantially cylindrical sealing head, which provides positive sealing by mating with a tapered sealing seat in the product outlet chamber. In the best mode of the invention, the fluid chamber for activating the product dispensing piston is pneumatically controlled.

A first seal is provided intermediate a leak detection port and the fluid chamber and a second seal is provided intermediate the leak detection port and the product outlet chamber to provide positive identification of seal failure and to prevent contamination of the product with air or fluids which activate the fluid control product dispensing piston. The leak detection port in combination with different fluids, i.e., gas and liquid or fluids of different color, serves to positively identify the defective seal and provide a failsafe seal system to prevent contamination. In the preferred application of the invention, the product dispensing piston is activated by air as the fluid activation means and in the preferred application the identification of the defective seal is provided by the release of a fill liquid or a gas from the leak detection port while preventing cross contamination.

The novel positive control fill valve assembly can include an optional nozzle having one or more fluid ports provided in the outlet nozzle. In this embodiment of the invention, the substantially cylindrical seating head is designed to mate with the tapered outlet so that fluids remaining in the channels of the nozzle are positively controlled by the seating of the cylindrical shaped piston head in the tapered nozzle head so that the viscosity of the fluid in combination with the size and number of channels in the nozzle prevent fluids from dripping much in the same manner as trapping liquid in a straw prevents fluid displacement in the straw. The combination of the sealing head together with the tapered seat in proximity to the channels of the nozzle similarly prevents further fluid from displacing the fluid captured in the channels of the nozzle.

In another embodiment of the invention, where fluids having high viscosities and low densities such as alcohol are dispensed, the product outlet chamber, at its upper end, may include an inwardly tapering wall which provides a seat for the upper surface of the substantially cylindrical head of the product dispensing piston. In this embodiment, a nozzle with a single large opening may be utilized to provide for the dispensation of the product. In either embodiment, the substantially cylindrical head of the product dispensing piston is designed to remain in the path of flow in the product dispensation chamber to assist in the dispensation of the product into the container in a manner that prevents sloshing, spilling or dripping into a container disposed below the novel positive control fill valve assembly.

The novel positive control fill valve assembly is preferably made of stainless steel or other material that provides the highest purity and hygienic standards for the sanitary dispensing of flowable materials, particularly medicines and food products. As such, the novel positive control valve assembly is typically made of high grade non-corrosive stainless steel that is without seams, threads, welds or other surface imperfections that would allow accumulation or accretion of any particles that would result in contamination of the dispensed product. Preferably, the novel positive control fill valve assembly includes a flange disposed at the nozzle or dispensation end of the positive control fill valve assembly to allow the entire nozzle, valve, product outlet and product inlet chambers to be cleaned in place (CIP capability) by the backflow circulation of cleaning solutions through and around the tapered valve seat and cylindrical piston head of the product dispensing piston and in and through the product inlet.

The novel leak detection port provides a positive identification of the precise location of a pending seal failure that would result in contamination of the dispensed product or the fluid activation means for activating the product dispensing piston. This positive identification of the breaking down of one of the two seals in the novel positive control fill valve assembly prevents not only contamination of the piston activation fluid, but even more importantly product contamination and prevents costly recall of products packaged in prior art equipment that have been contaminated due to seal failure. This positive identification of the deterioration of the seal, as well as whether the seal is on the pneumatic side of he piston or on the product side of the piston prevents the packaging and possible shipment of contaminated products by employing a failsafe system to prevent the subsequent expensive recall of defectively filled and contaminated packaged products.

BRIEF DESCRIPTION OF THE DRAWINGS

The advantages of the invention will become more apparent to those skilled in the art in conjunction with the detailed description of the preferred embodiment of the invention, in which.

DETAILED DESCRIPTION OF THE PREFERRED EMBODIMENT

The novel positive control fill valve assembly is designed to positively control the dispensation of flowable materials in a product container and in particular a variety of viscous fluids, such as yogurt, milk, water, ice cream beverages and other such flowable food products or pharmaceutical preparations or medical and medicines which require a positive control fill valve for dispensing and metering precise quantities of a liquid product into a container requiring hygienic and sanitary dispensation of the liquid product fill material.

The novel positive control fill valve assembly provides for not only the positive metering and control of fluids into packages and containers, but also prevents the sloshing and splashing during the dispensation of the flowable product and prevents dripping at the end of the fill cycle by providing a positive control over the closing of a valve provided by the combination of the tapering piston valve seat in combination with the sealing head of the product dispensing piston. In addition, the novel fill valve assembly provides positive control and identification of the location of seal deterioration before seal deterioration can result in contamination of food, pharmaceutical, medicine or medical material with oils, fluids or airborne materials utilized to activate the product dispensation piston for activating the positive control fill valve assembly. The novel fill valve assembly is designed to operate over a wide range of operative pressure conditions required for dispensing a variety of liquid products having a wide range of viscosities. Typically the product dispensing piston operates at pressure of from about 2 to 60 psi for dispensing fluid products while providing a positive control over the quantity of material dispensed without dripping and without contamination of the fill material with fluids employed to activate the product dispensing piston.

Figure 1:
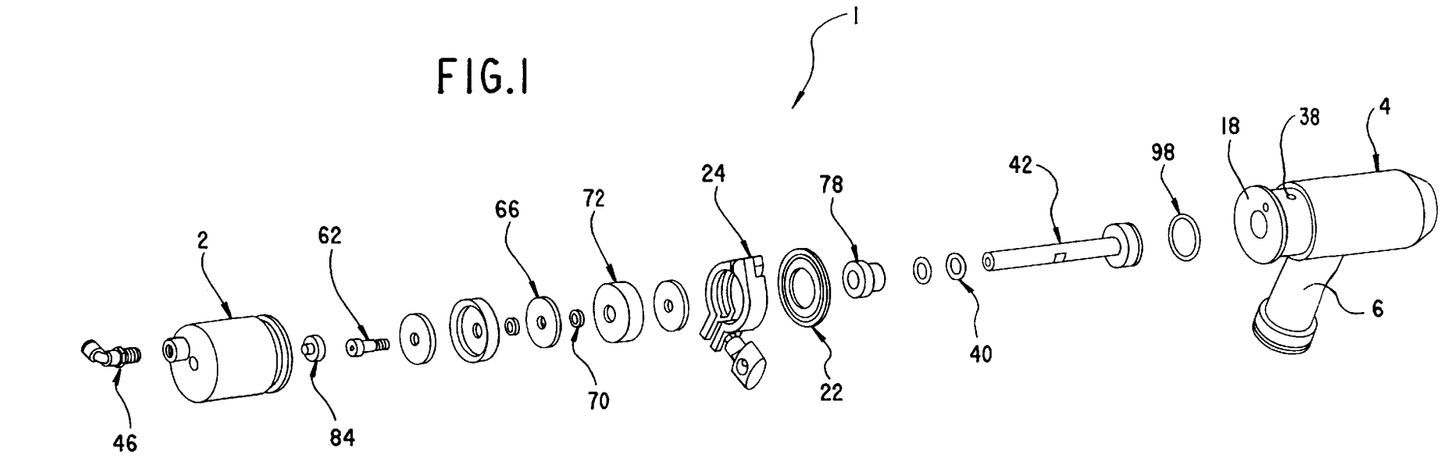
FIG. 1 is an exploded view of the preferred embodiment of the novel positive control fill valve assembly of the invention.
Figure 1A:
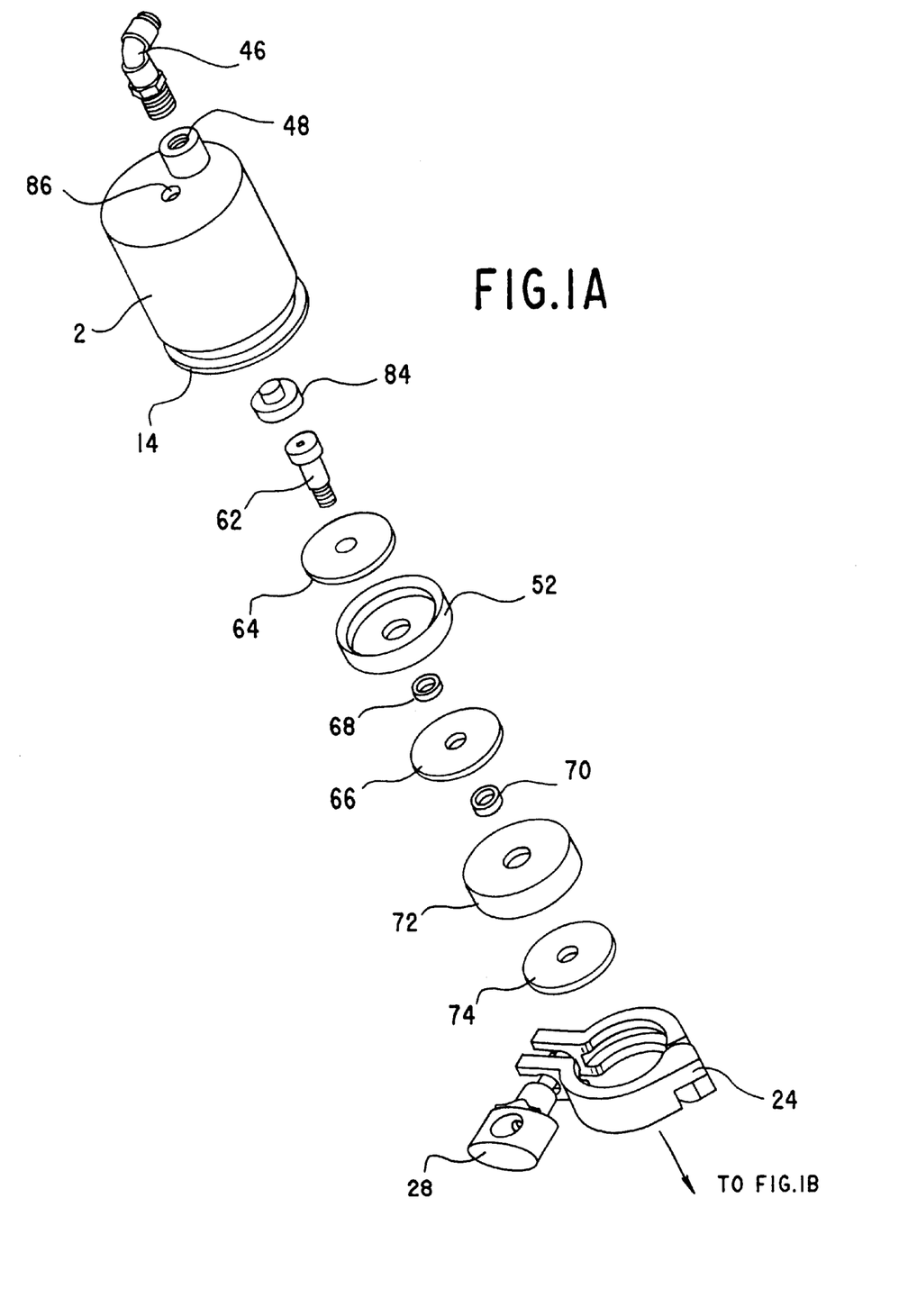
FIGS. 1A and 1B are exploded views of the best mode of the fill valve assembly similar to FIG. 1 illustrating the novel control fill valve assembly in greater detail.
Figure 1B:
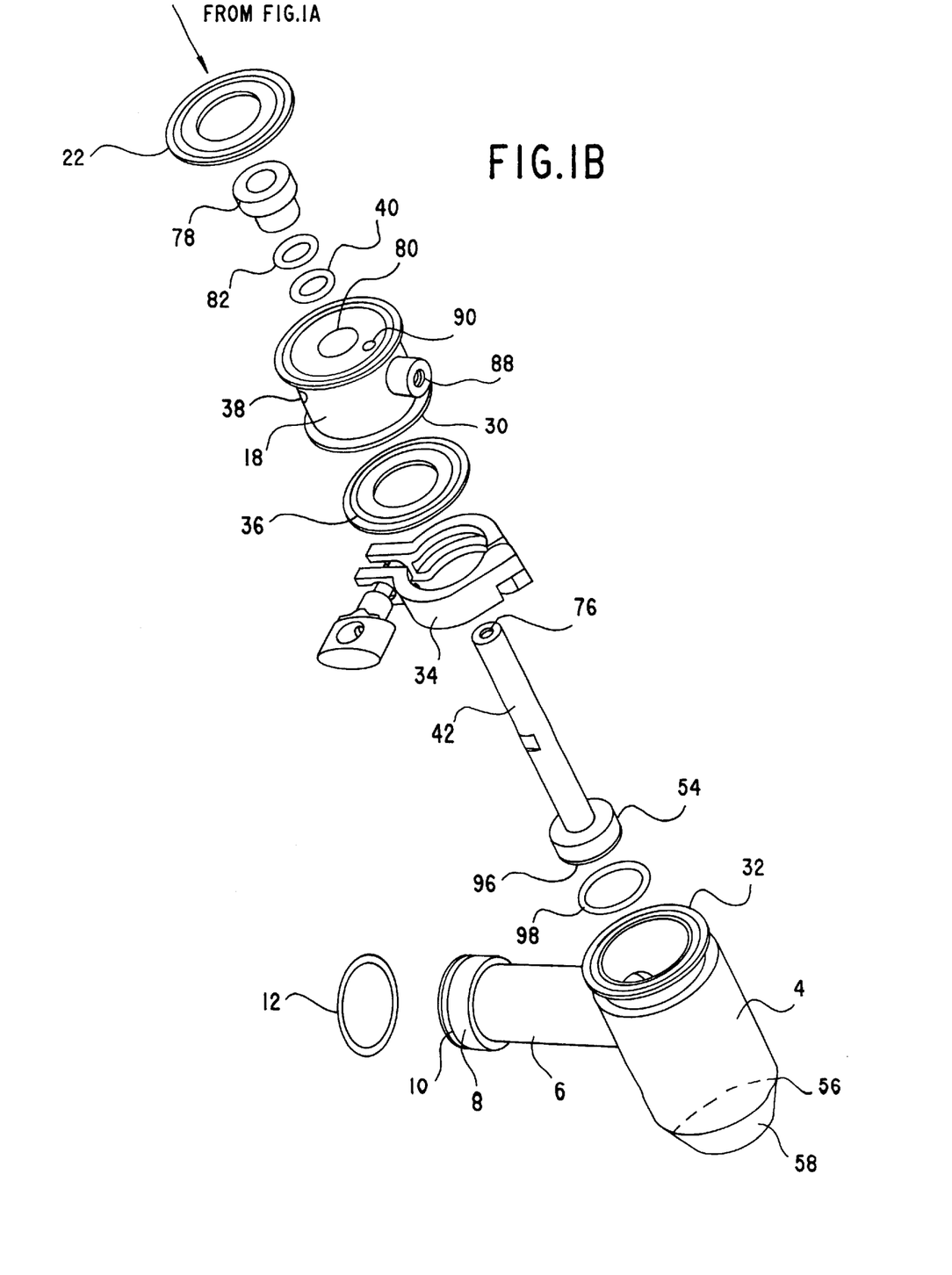

Referring now to FIGS. 1, 1A and 1B, the novel positive control fill valve assembly 1 includes, at one end, a cylinder housing assembly 2 and at the other end, a product dispensation cylinder 4. The product dispensation cylinder 4 includes a product inlet 6, which, at one end, includes a flange 8 and a groove 10 for receiving an O-ring 12 (FIG. 1B), which is connected to a product reservoir (not shown) by means of a flange clamp (not shown) to provide a good metal to metal plus O-ring seal that is sometimes not achieved in the prior art that utilize flexible hoses attached to prior art nozzles. Further, the novel fill valve assembly 1 is of a compact design and does not require the utilization of flexible hoses to connect to the novel fill valve assembly 1 from the product manifold which has resulted in leaking in the prior art fill assemblies.

Figure 2:
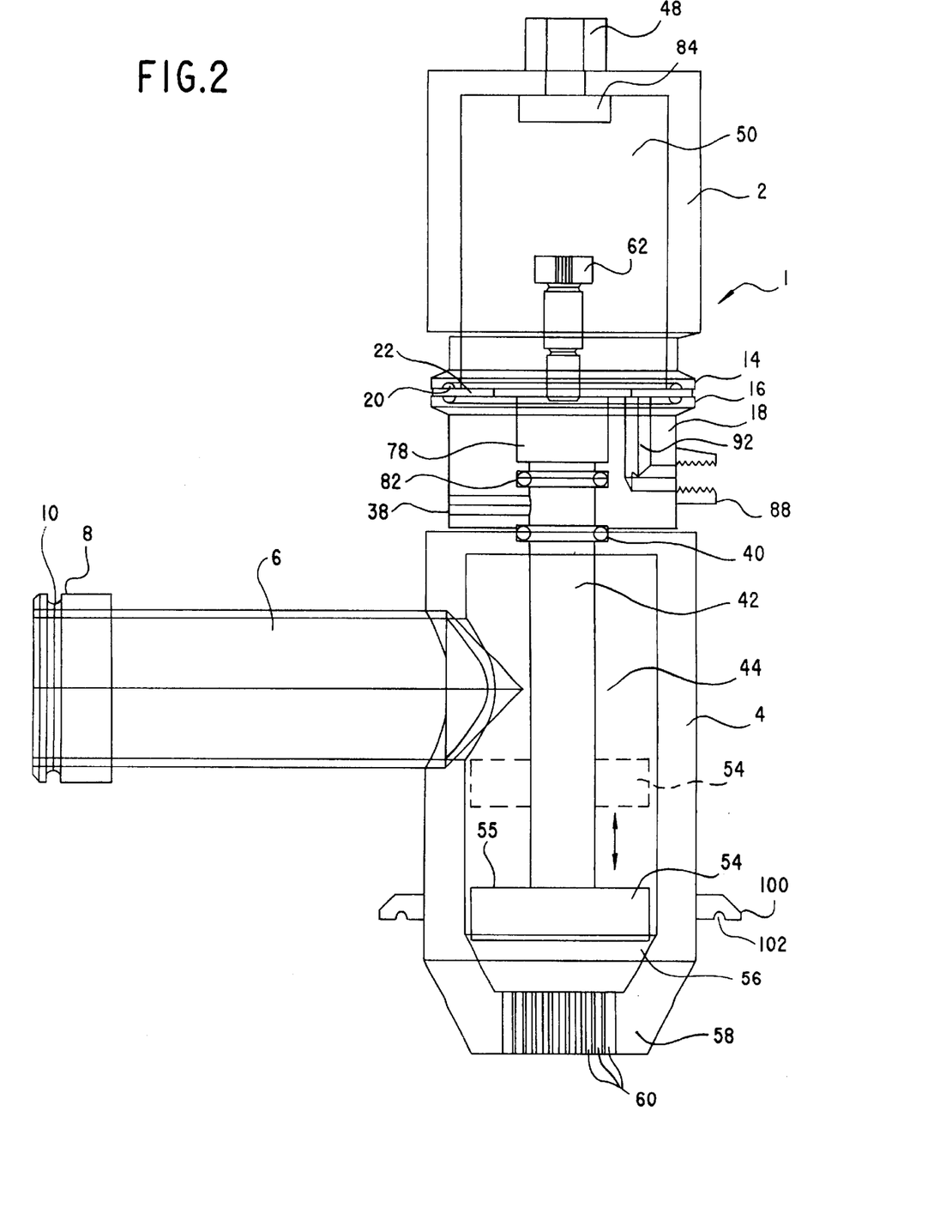
FIG. 2 is a side cut away elevational view of the novel positive control fill valve assembly of FIG. 1.

Referring now to FIGS. 1A, 1B and 2, the novel positive control fill valve assembly 1, includes a flange 14 (FIG. 1A) on the cylinder housing assembly 2 and a corresponding flange 16 on the main valve body 18, which together form a groove 20 (FIG. 2) for receiving a gasket seal 22 to provide an airtight seal between cylinder housing assembly 2 and main valve body 18 which are held together by flange clamp 24 (FIG. 1A). Flange clamp 24 is preferably a Triclover flange clamp as manufactured by Triclover, Inc. of Kenosha, Wis. The Triclover clamp 18 is pivoted at end 26 and includes an adjustable key nut 28 for firmly securing the flange clamp around flanges 14 and 16 to provide an airtight seal.

In the best mode of the invention a second flange 30 is provided on main valve body 18 in the preferred embodiment of the invention to connect main body 18 to cylinder housing assembly 2 (FIG. 1B) in accordance with the preferred embodiment of the invention. The purpose of providing a second flange 30 and the corresponding flange 32 on product dispensation cylinder 4 is to assist in the disassembly and removal and replacement of the novel leak detection port assembly as will be described hereinafter in greater detail. The second flange 30 on main valve body 18 is secured to corresponding flange 32 on product dispensation cylinder 4 by a second flange clamp 34, which also preferably is a Triclover flange clamp similar to Triclover flange clamp 24. A fluid tight seal is provided between main valve body 18 and product dispensation cylinder 4 by a gasket 36. Where the optional second flange is utilized it is placed near or below the leak detection port 38 to assist in the disassembly and replacement of product seal O-ring 40. Alternatively, main valve body 18 can be constructed as a single piece as part of cylinder housing assembly 2, as illustrated in FIGS. 1 and 2.

A product dispensing piston rod 42 is provided for dispensing a viscous product from chamber 44 (FIG. 2) in product dispensation cylinder 44. Product dispensing piston rod 42 is activated by fluid, which, in the best mode is pneumatic air pressure supplied by fitting 46 through port 48 in cylindrical housing assembly 2. Air pressure introduced through port 48 into chamber 50 of cylinder housing assembly 2 is designed to force a cylinder cup or piston 52 down to the bottom of chamber 50 to force substantially cylindrical seal 54 on product dispensing piston rod 42 into tapered seat 56 of product dispensing cylinder 4. The seat between the tapered wall forming tapered seat 56 provides a positive control for shutting off product dispensed through nozzle 58 of product dispensing cylinder 4.

Nozzle 58 may be configured in a variety of ways depending upon the physical characteristics of the liquid fill material. Nozzle 60 is designed to contain a plurality of channels 60, the number and size of which are related to the viscosity of the product being pumped into product inlet 6 and dispensed through the channels 60. The higher the density and the lower the viscosity of the liquid fill product, the greater the number of channels since the seating of substantially cylindrical seal 54 in tapered seat 56 provides a fluid tight seal. This fluid tight seal prevents further product from being dispensed through channels 60 in which trapped product in channels 60 prevents dripping of product through the nozzle 58 or channels 60. Further the product under pressure from product inlet 6 and product chamber 44 exerts a positive force on the top 55 of substantially cylindrical seal 54 which forces the substantially cylindrical seal 54 into the tapered seat 56. The density and constant pressure over fill material introduced into product chamber 44 increases the positive control over the positive control fill valve assembly. Conversely, where less dense and fluids of high viscosity are dispensed through the novel positive control fill valve assembly, the nozzle may be modified as well as the seating arrangement of the piston sealing head in the tapered sealing seat as will be described hereinafter in greater detail with respect to FIG. 3.

A cap screw 62 (FIG. 1A) connects cylinder cup 52 to product dispensing piston rod 42 through a pair of washers 64 and 66, through a pair of adaptor rings 68 and 70 and through a second cylinder cup or piston 72, through washer 74. Cap screw 62 is received in threaded opening 76 of product dispensing piston rod 42. The action of fluid pressure on cylinder cup 52 forces seal 54 into tapered seat 56 and the action of fluid pressure on cylinder cup 72 retracts piston 42 and removes seal 54 from tapered seat 56.

Product dispensing piston rod 42 is guided in main valve body 18 by a bushing 78, which is fitted into opening 80 of main valve body 18. Bushing 78 is preferably made of a plastic material and preferably composed of a Delrin, Teflon or Delrin Teflon composition which assists product dispensing piston rod in reciprocating in chamber 50 and product chamber 44. Disposed below bushing 78 is pneumatic air seal O-ring 82. Disposed intermediate product seal O-ring 40 and pneumatic air O-ring seal 82 is leak detection port 38, which provides a positive indication as to whether pneumatic air O-ring seal 82 or whether product seal O-ring 40 is defective. The combination of leak detection port 38 with pneumatic air O-ring seal 82 and product seal O-ring 40 prevents contamination of the product with the product dispensing piston rod 42 activation fluid in a manner that will be described hereinafter in greater detail.

Cylinder housing assembly 2 includes a pad 84 that is designed to fit in opening 86 of cylinder housing assembly 2. Pad 84 can be optionally threaded into opening 86 to provide adjustment of product dispensing piston rod 42 in chambers 50 and 44. Alternatively adjustment may be provided by adaptor rings 68 and 70 in combination with the threads on cap screw 62 to accommodate adjustment in the amount of travel of product dispensing piston rod 42 in chambers 50 and 44.

The activation of product dispensing piston rod 42 to remove the substantially cylindrical seal 54 from tapered seat 56 is accomplished by the introduction of air pressure through fitting 88, which is connected to opening 90 through passage 92 (FIG. 2.). Passage 90 communicates with second cylinder cup 72 to push second cylinder cup 72 up into chamber 50 until cap screw 62 contacts pad 84. As will be recognized, the opening of product dispensing piston rod 42 allows product from product inlet 6 to travel around the sides of product dispensing piston rod 42, as well as around substantially cylindrical seal 54 and out of channels 60 and nozzle 58. The passage of a viscous product from inlet 6 into chamber 44 and around retracted product dispensing piston rod 42 and substantially cylindrical seal 54 prevents sloshing or undue turbulence of the dispensed product as it enters nozzle 58 and through channels 60. Dispensed product from product inlet 6 is substantially under constant pressure which assists in urging cylindrical seal 54 in tapered seat 56 when the fill valve is closed. The novel product dispensing piston rod with the sealing head thereby provides two functions; not only does it provide a positive seal for the novel positive control fill valve assembly, but it also assists in preventing the product from undue turbulence and spilling and sloshing as it enters nozzle 58 and exits channels 60.

As will be recognized by those skilled in the art, air pressure in chamber 50 controls the position of the product dispensing piston rod 42 in product chamber 44. This provides numerous advantages in not only preventing sloshing or undue turbulence but also for maintaining the substantially cylindrical seal 54 in any desired intermediate position. This is particularly advantageous where liquids of varying temperature, density, viscosity and compressibility are dispensed since the difference in air pressure introduced through fitting 88 and/or pressure port 48 can be used to control the position of substantially cylindrical seal 54 in chamber 44 in relation to the density, viscosity, and compressibility of the dispensed fluid. This is particularly the case where foods such as ice cream are dispensed in the novel fill valve since temperature variation of the ice cream varies the density and viscosity of the food product.

The novel positive control fill valve assembly further prevents contamination of dispensed products with oils, gases and other contaminants present in activation fluids necessary to activate product dispensing piston rod 42. Even where air pressure is utilized in chamber 50 to open and close product dispensing piston rod 42, such air, even when filtered, contains trace amounts of contaminants, oils and other materials that are deleterious to foods, medicines and other products dispensed through fill valve assemblies. The contamination of product has resulted in contamination and recall of food products and substances and pharmaceutical materials, as well as other hygienically packaged products. This contamination is eliminated by the novel leak detection port 38 disposed intermediate the product seal O-ring 40 and the O-ring seal 82.

The purpose of the dual seal, in combination with the leak detection port, is to allow accurate and quick assessment of seal condition by determining whether product O-ring seal 40 is defective, in which case product passes through seal 40 and is stopped by O-ring seal 82 causing the product to exit leak detection port 38 positively identifying seal 40 as defective. Alternatively, if O-ring seal 82 is defective, air pressure or activation fluid travels down the side of product dispensing piston rod 42 and is prevented from contaminating the product by product seal O-ring 40 causing air pressure or activation fluid to exit leak detection port 38 to indicate the requirement for maintenance on seal 82. Where an activation fluid other than gas is used to activate product dispensing piston rod 42 such activation fluid can be dyed in an indicator color different from the dispensed product to assist in defective seal identification. In the preferred application of the invention, a product seal 40 and seal 82 are quad seal rings, such as may be obtained from McMaster, Inc. manufacturer of Norwalk, Calif.

Figure 4:
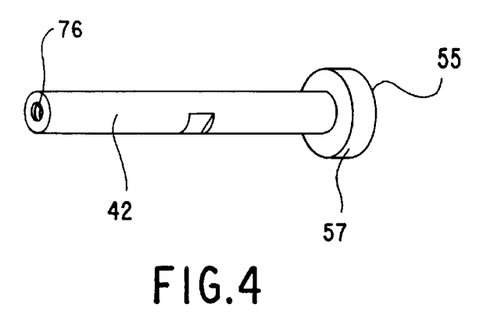
FIG. 4 is a perspective view of an alternative embodiment of the product dispensing piston.
Figure 5:
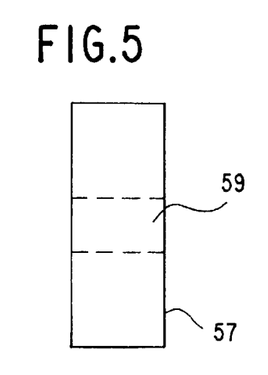
FIG. 5 is a side elevational view of an alternative embodiment of the sealing head of the product dispensing piston of FIG. 4.
Figure 6:
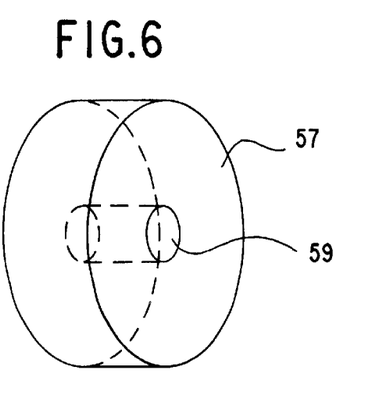
FIG. 6 is a perspective view of the sealing head of FIG. 5.
Figure 7:
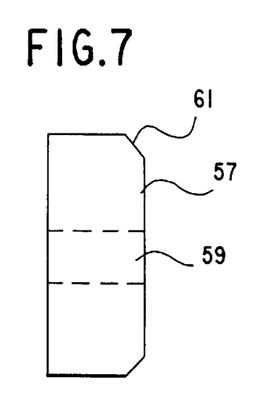
FIG. 7 is a side elevational view of an alternative embodiment of the sealing head of FIG. 6.

The substantially cylindrical seal 55 may be modified to have a rubber of elastomeric sealing head 57 as illustrated in FIGS. 4, 5 and 6. Sealing head 57 includes a hole 59 for attachment to product dispensing piston rod 42. Sealing head 57 can include a taper 61 to assist in sealing in tapered seat 56 as illustrated in FIG. 7. Alternatively, product dispensing piston rod 42 may have a metal head 54 as illustrated in FIG. 1B together with a groove 96 for receiving an O-ring seal 98 to provide additional advantages in dispensing various types of products and providing a seal in tapered seat 56.

The novel positive control fill valve assembly 1 further optionally includes a cleaning flange 100 with an O-ring seal groove 102 (FIG. 2) for receiving a cleaning assembly (not shown), which mates with cleaning flange 100 to provide clean in place CIP capabilities by the backflow of cleaning fluid through channels 60 in nozzle 58 and in and through product chamber 44 and around substantially cylindrical seal 54 and around product dispensing piston rod 42 and out through product inlet 6 to provide for the periodic cleaning of all of the internal components of the novel positive control fill valve assembly that are in contact with dispensed fill product.

Figure 3:
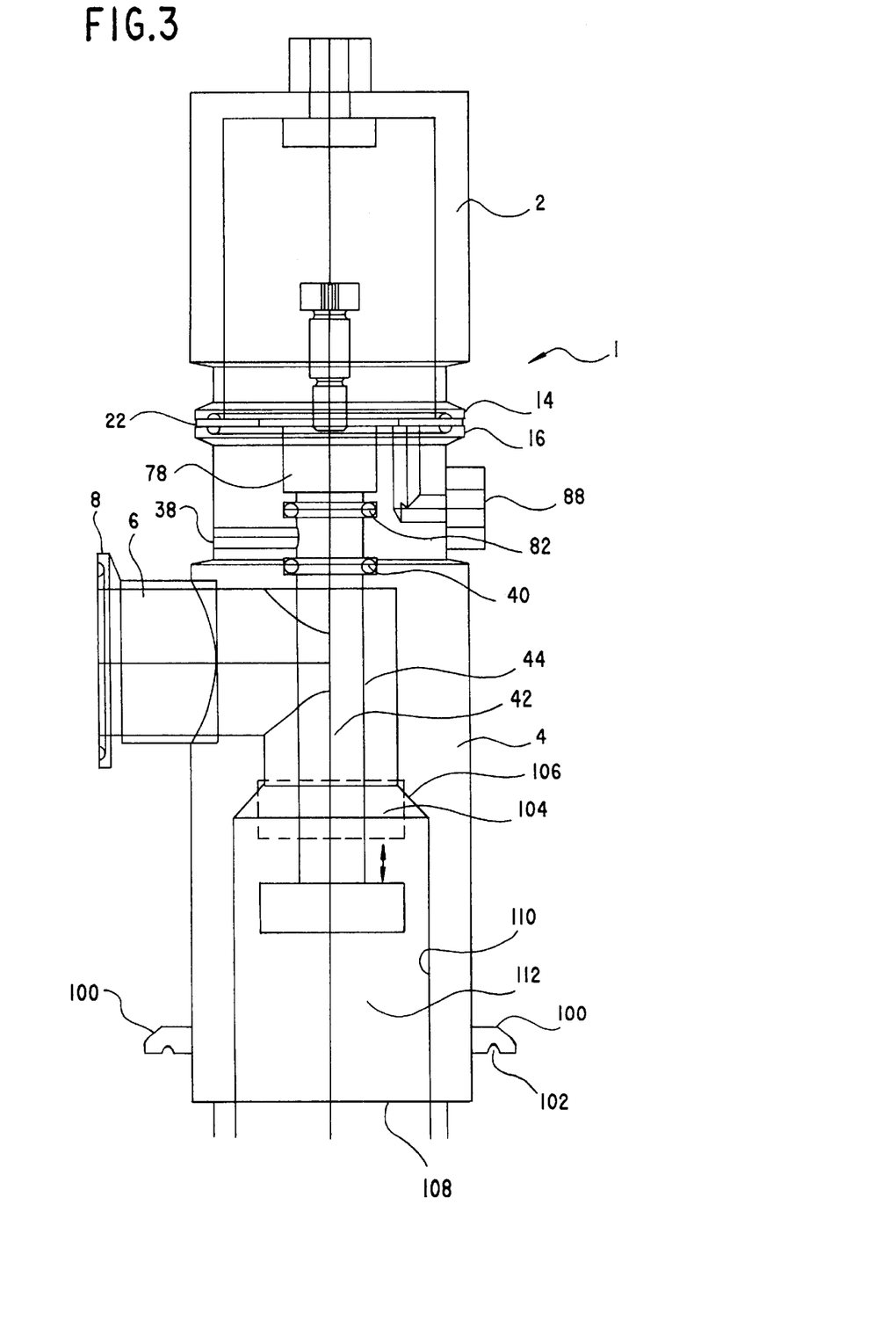
FIG. 3 is a side cut away elevational view of an alternative embodiment of the novel positive control fill valve assembly.

Referring now to FIG. 3, an alternative embodiment of the novel positive control valve is illustrated in which product dispensing piston rod 42 has been slightly modified by utilizing a modified cylindrical sealing head 104 made of rubber or an elastomeric material similar to FIGS. 4, 5 and 6 which provides a seal at the modified tapered seat 106. Modified cylindrical sealing head 104 can be constructed like substantially cylindrical seal 54 in which case groove 96 and O-ring seal 98 would be attached to product dispensing piston rod 42 with O-ring seal 98 facing modified tapered seat 106.

The pneumatic activation of the product dispensing piston rod 42 in FIG. 3 and the components for the activation of the product dispensing piston rod 42, as well as the leak detection port 38 are all identical to the components previously described with respect to FIGS. 1 and 2. Further the product inlet into the product chamber 44 remains also the same, except that, as illustrated in FIG. 3, the seal between the modified cylindrical sealing head 104 and tapered seat 106 occurs at the top of the cylindrical sealing head 104 and the bottom of chamber 44. The novel positive control fill assembly valve, as illustrated in FIG. 3, is primarily used for less dense liquids having a greater viscosity such as alcohol and other such products where a nozzle 58 is not required due to the physical characteristics of the liquid dispensed. In such cases, where alcohol or other liquids of a greater viscosity are dispensed, the open end 108 of the product dispensing chamber allows such liquids to drain from the sides 110 of the product dispensing nozzle 112, while the seal between modified cylindrical sealing head 104 and modified tapered seat 106 provides a positive control fill valve. Similarly, the modified novel product positive control fill valve, as illustrated in FIG. 3, may include a cleaning flange 102 to provide for the cleaning of nozzle 112, interior of sides 110 modified cylindrical sealing head 104, modified tapered seat 106, chamber 104, as well as the product inlet 6.

Figure 8:
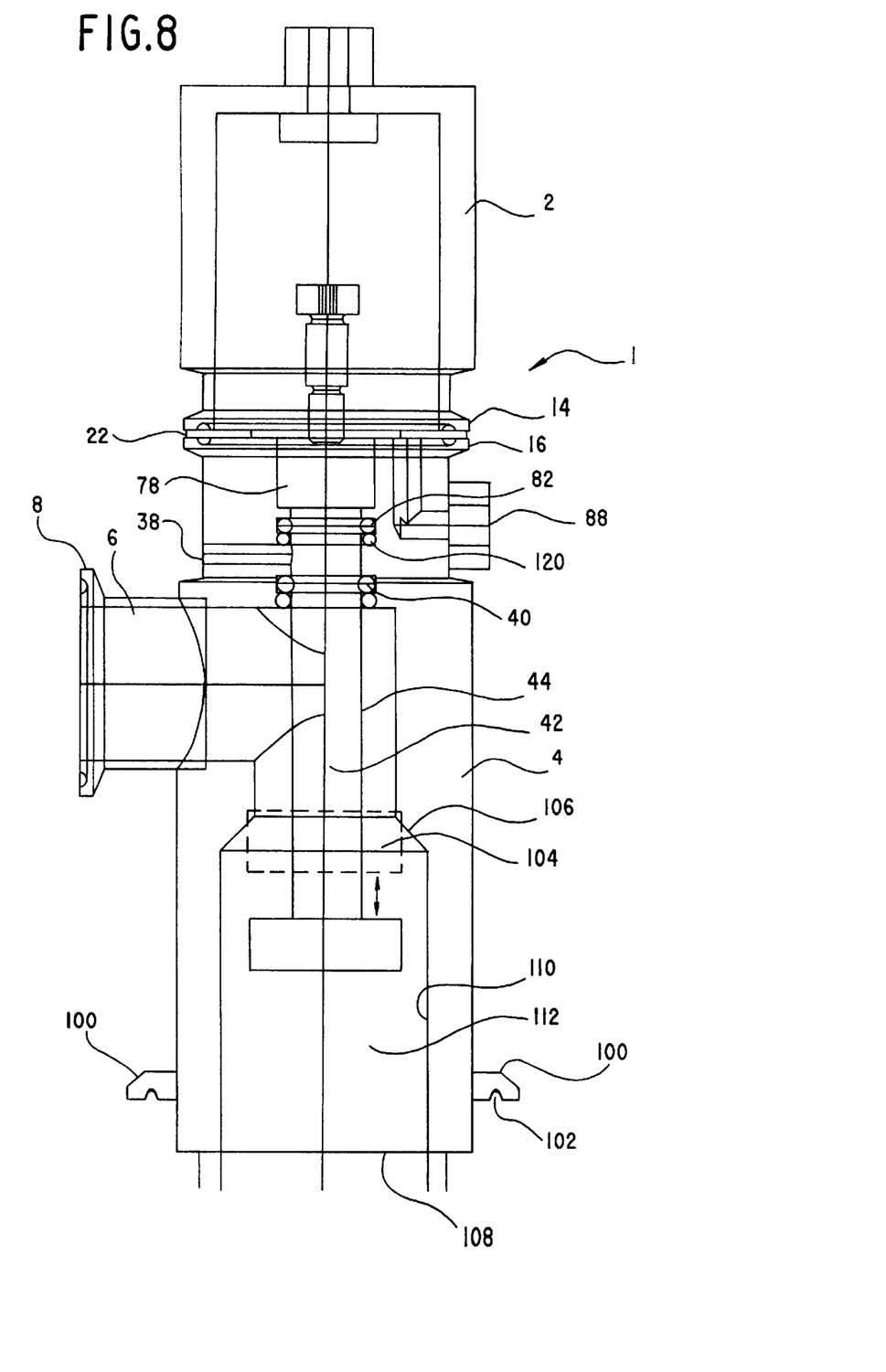
FIG. 8 is a side elevational view similar to FIG. 3 illustrating the application of multiple seals in combination with the leak detection port.

Referring now to FIG. 8 a further embodiment of the leak detection port 38 is illustrated. The leak detection port 38 includes a first O-ring seal 82 and a second O-ring seal 120 in axial alignment with the first O-ring seal 82. This arrangement serves to increase the sealing area between the leak detection port and the pneumatic chamber for activating product dispensing piston rod 42. This arrangement of a second seal is similar to the utilization of a quad seal as heretofore discussed. It is possible to utilize multiple seals not only between the lead detection port and the pneumatic chamber for activating piston rod 42, but also between the leak detection port 38 and the product chamber 44. The desirability of employing multiple seals is not only related to the relationship between the activation fluid employed and the dispensed fluid but also the efficiency of bushing 78 in slidably engaging piston rod 42.

As will be recognized from the foregoing, the novel positive control fill valve assemblies of the invention provide numerous advantages over the prior art fill valves by providing, not only a positive control over the volume of fluids dispensed, but also reducing the amount of sloshing, spilling and frothing of product as it is dispensed by the utilization of the novel sealing head in combination with the tapered sealing seat provided in the novel positive control fill valve assembly. Numerous modifications may be made in the components and activation of the product dispensing piston as well as the materials of which the novel sealing head is constructed, as well as modifications in the shape of the novel sealing head as heretofore as been discussed.

Numerous modifications and changes can also be made to the novel leak detection port for preventing contamination of food product with piston activation fluids to suit particular arrangements and machine requirements. Also changes and modifications can be made in the nozzle and the arrangement of the tapered sealing seat and cylindrical sealing head, as well as the types of nozzles and channels provided in the nozzles to provide a wide range of adaptability to various types of fluids to suit particular requirements. These and other such modifications, as are made by those skilled in the art, are deemed to be included within the scope of the claims.

As used herein and in the following claims, the word 'comprising' or 'comprises' is used in its American technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated that these and other modifications can be made within the scope of the invention as defined in the following claims.

What is claimed is:

1. A two-way product dispensation valve comprising:
 (a) a fluid product dispensation housing having at one end a piston activation housing and an outlet port at the other end and a product chamber and a cylindrical passage connecting said outlet port with said product chamber and an inlet port communicating with said product chamber disposed intermediate said piston activation housing and said outlet port;
 (b) a piston rod disposed in said cylindrical passage having a sealing head disposed on said piston rod, said sealing head having a diameter greater than said piston rod and disposed in said product chamber intermediate said inlet port and said outlet port;
 (c) a tapered wall in said product dispensation housing forming a sealing seat for said sealing head;
 (d) a leak detection port disposed in said fluid product dispensation housing connecting a portion of said piston rod and said cylindrical passage with the ambient environment;
 (e) a first fixed seal disposed intermediate said leak detection port and said product chamber, said first fixed seal having a hole therethrough for surrounding said piston rod and sealing said product chamber from said leak detection port;
 (f) a second fixed seal disposed intermediate said leak detection port and said piston activation housing, said second fixed seal having a hole therethrough for surrounding said piston rod and sealing said piston activation housing from said leak detection port; and
 (g) a piston activation housing having pneumatic means for maintaining positive control over the position of said sealing head with respect to said sealing seat for accurately dispensing fluid products having a variety of physical properties related to density, temperature and pumping pressure while providing a positive indication as to seal failure as between said first fixed seal and said second fixed seal to prevent cross contamination between products dispensed and said pneumatic means for maintaining positive control over said piston.

2. The two-way product dispensing valve of claim 1 wherein said piston activation housing includes adjustment means for setting the position of said sealing head with respect to said sealing seat once a desired accurate dispensing of a particular product is achieved.

3. The two-way product dispensing valve of claim 2 wherein said sealing head is of a smaller diameter than said outlet port but is of a diameter greater than tapered wall.

4. The two-way product dispensing valve of claim 3 wherein said sealing head travels less than the entire length of said outlet port.

5. The two-way product dispensing valve of claim 4 wherein said product inlet port is disposed above the length of travel of said sealing head.

6. The two-way product dispensing valve of claim 5 further comprising a nozzle on said outlet port.

7. The two-way product dispensing valve of claim 6 wherein said nozzle includes a plurality of openings.

8. The two-way product dispensing valve of claim 7 wherein said nozzle includes 12 openings.

9. The two-way product dispensing valve of claim 6 wherein said nozzle includes a clean in place fitting.

10. The two-way product dispensing valve of claim 9 wherein said first fixed seal and second fixed seal are O-ring seals.

11. The two-way product dispensing valve of claim 9 wherein said first fixed seal and second fixed seal are quad ring seals.

12. The two-way product dispensing valve of claim 5 wherein said piston activation housing includes means for adjusting the travel of said sealing head in said product chamber.

13. The two-way product dispensing valve of claim 12 wherein said piston activation housing is detachable from said fluid activation housing.

14. The two-way product dispensing valve of claim 13 wherein said piston activation housing and said fluid activation housing are connected with a flange clamp.

15. The two-way product dispensing valve of claim 14 wherein said outlet port includes a nozzle with a clean in place flange.

16. A two-way product valve comprising:
 (a) a two-way valve housing having a passage therethrough said passage having at one end a product dispensation outlet and a substantially confronting piston rod wall at the other end and a product chamber disposed intermediate said product dispensation outlet and said confronting piston rod wall;

(b) a piston rod having a substantially uniform diameter for seating in said substantially confronting piston rod wall, said piston rod having scaling head disposed thereon within said product chamber said sealing head having a diameter greater than the diameter of said piston rod;

(c) a piston activation housing having means disposed therein for activating said piston rod with said sealing head to an open position, a closed position and a plurality of positions therebetween;

(d) a clamp for clamping said two way valve housing to said piston activation housing;

(e) a product inlet disposed in said two-way valve housing communicating with said product chamber intermediate said piston activation housing and said sealing head;

(f) a leak detection port in said two-way valve housing communicating with the ambient environment through the wall of said two-way valve housing and connecting a portion of said substantially confronting piston rod wall to said ambient environment;

(g) a first seal disposed in said two-way valve housing intermediate said leak detection port and said piston activation housing, said first seal at all times openly communicating with said leak detection port;

(h) a second seal disposed in said two-way valve housing intermediate said leak detection port and said product inlet and at all times openly communicating with said leak detection port; and (i) a seat for said sealing head disposed in said product dispensation outlet for receiving said sealing head to close said product dispensation outlet wherein said means within said activation housing for activating said piston rod maintains positive control over the position of said sealing head with respect to said seat for accurately dispensing fluid products having a variety of physical characteristics related to density, temperature and pumping pressure while said leak detection port provides an immediate indication of seal failure irrespective of the position of said piston rod.

17. The two-way product valve of claim 16 wherein said seat is of a tapered configuration.

18. The two-way product valve of claim 17 wherein said sealing head is of a cylindrical configuration.

19. The two-way product valve of claim 18 wherein said sealing head is composed of an elastomeric material.

20. The two-way product valve of claim 17 wherein said means for activating said piston is air pressure.

21. The two-way product valve of claim 20 wherein said first seal and said second seal are quad seals.

22. The two-way product valve of claim 20 wherein said product dispensation outlet is attached to said two way valve housing by a flange clamp.

23. The two-way product valve of claim 22 wherein said sealing head is of a cylindrical configuration and includes an O-ring at the end of said sealing bead.

24. The two-way product valve of claim 20 wherein said seat is disposed at the distal end of said product dispensation outlet.

25. The two-way product valve of claim 20 wherein said seat is disposed at the proximal end of said product dispensation outlet.

26. A two-way valve comprising:

(a) a two-way valve housing having a first end with a substantially confronting piston rod wall passage and a second end and a product therebetween;

(b) an inlet communicating with said product chamber disposed in said two-way valve housing intermediate said first end and said second end;

(c) a piston rod disposed in said substantially confronting piston rod wall passage said piston rod having a substantially uniform diameter and a sealing head of a diameter greater than said piston rod disposed intermediate said inlet and said second end;

(d) a product dispensation outlet nozzle disposed at the second end of said two-way valve housing;

(e) a detachable piston activation chamber disposed at said first end of said two-way valve housing to operate said sealing head and provide positive control over the opening of said outlet, a closing of said outlet as well as to move said sealing head to plurality of positions therebetween;

(f) a clamp for securing said detachable piston activation chamber to said two-way valve housing;

(g) a leak detection port communicating to the ambient atmosphere through a wall in said two-way valve housing and communicating with said substantially confronting piston rod wall;

(h) a first seal disposed intermediate said leak detection port and said detachable piston activation chamber;

(i) a second seal disposed intermediate said leak detection port and said product dispensation nozzle; and (j) a tapered sealing seat disposed intermediate said product chamber and said product dispensation outlet nozzle wherein said detachable piston activation chamber for operating said sealing head maintains positive control over said sealing head disposed in the path of flow of the dispensed product which in combination with said positive control over said piston rod and said product dispensation outlet nozzle provides control for accurately dispensing fluid products having a variety of physical characteristics related to density, temperature, and pumping pressure.

27. The two-way valve of claim 26 wherein said tapered sealing seat is disposed at the bottom of said product chamber.

28. The two-way valve of claim 26 wherein said tapered sealing seat is disposed in said product dispensation outlet nozzle.

29. The two-way valve of claim 28 wherein said tapered sealing seat is disposed at the distal end of said product dispensation outlet nozzle.

30. The two-way valve of claim 29 wherein said tapered sealing seat is disposed at the proximal end of said product dispensation nozzle.

31. The two-way valve of claim 26 further comprising a third seal disposed intermediate said detachable piston activation chamber and said first seal.

32. The two-way valve of claim 31 further comprising a fourth seal disposed intermediate said product dispensation outlet nozzle and said second seal.

33. The two-way valve of claim 26 wherein said two-way valve housing and said detachable piston activation chamber are held together with a flange clamp.

34. The two-way valve of claim 33 wherein said two-way valve housing and said product dispensation outlet nozzle are held together with a flange clamp.

35. The two-way valve of claim 26 wherein said sealing head is an elastomeric sealing head of a cylindrical configuration.

36. A process for the hygienic filling of containers comprising:

(a) pumping a fluid fill material through an inlet to a chamber connected to fill a nozzle;

(b) pneumatically operating a piston rod having a sealing head to an open position, a closed position, as well as a plurality of positions therebetween to open and close said chamber having a sealing seat connected to said fill nozzle and maintain positive control over the position of said sealing head in relation to said sealing seat to maintain positive control over said sealing head to accurately dispense fluid products having a variety of physical characteristics related to density, temperature, and pumping pressure;

(c) providing a leak detection port having a substantially confronting piston rod wall to said piston rod and providing constant communication among the first seal, the second seal and the ambient environment to provide an immediate indication of seal failure irrespective of the position of said piston rod;

(d) providing a first seal between said fill nozzle and said chamber connected to said fill nozzle; and (e) providing a second seal between said first seal and the pneumatic operation of said piston wherein said first seal, said second seal, and said leak detection port provide a positive and immediate indication of seal failure to prevent contamination of said fluid fill material with pneumatic air pressure for operating said piston rod while said sealing head remains in the path of flow of said fluid fill material.

37. The process of claim 36 further comprising the step of maintaining substantially constant pump pressure on said fill material in said inlet while pneumatically operating said piston in a variety of positions.

38. The process of claim 37 further comprising the step of providing a positive control valve between said fill nozzle and said chamber.

39. The process of claim 38, wherein said positive control valve is provided by a sealing head on said piston and a tapered sealing seat disposed at the distal end of said chamber.

40. The process of claim 38 wherein said positive control valve is provided at the proximal end of said nozzle.

41. The process of claim 40 further comprising the step of preventing dripping from said plurality of channels after filling said container.

42. The process of claim 41 wherein said step of preventing dripping is accomplished by locating said positive control valve at the distal end of said nozzle adjacent to said channels.

43. The process of claim 42 wherein said fluid fill material is a dairy product.

44. The process of claim 43 wherein said dairy product is yogurt.

* * * * *